United States Patent
Chappell

(10) Patent No.: US 7,340,344 B2
(45) Date of Patent: Mar. 4, 2008

(54) SPHERICAL POSITION MONITORING SYSTEM

(75) Inventor: Charles D. Chappell, Treasure Island, FL (US)

(73) Assignee: Honeywell International Inc., Morristown, NJ (US)

( * ) Notice: Subject to any disclaimer, the term of this patent is extended or adjusted under 35 U.S.C. 154(b) by 85 days.

(21) Appl. No.: 11/004,531

(22) Filed: Dec. 3, 2004

(65) Prior Publication Data

US 2006/0058946 A1    Mar. 16, 2006

Related U.S. Application Data

(60) Provisional application No. 60/608,819, filed on Sep. 10, 2004.

(51) Int. Cl.
*G01C 21/26* (2006.01)
(52) U.S. Cl. .................. 701/220; 702/150
(58) Field of Classification Search ............ None
See application file for complete search history.

(56) References Cited

U.S. PATENT DOCUMENTS

| | | | |
|---|---|---|---|
| 2,959,060 A * | 11/1960 | Kunz ................ | 74/5.6 A |
| 3,039,316 A | 6/1962 | Slater | |
| 3,056,303 A | 10/1962 | Naylor | |
| 3,328,595 A * | 6/1967 | Todd, Jr. ........... | 250/231.13 |
| 3,365,942 A | 1/1968 | Blazek | |
| 3,439,546 A | 4/1969 | Baker et al. | |
| 3,576,124 A | 4/1971 | O'Connor | |
| 3,670,585 A | 6/1972 | Alexander et al. | |
| 3,769,710 A | 11/1973 | Reister | |
| 3,782,167 A | 1/1974 | Stuelpnagel | |
| 4,003,265 A | 1/1977 | Craig et al. | |
| 4,150,579 A | 4/1979 | Vaughn | |
| 4,244,215 A | 1/1981 | Frosch et al. | |
| 4,488,041 A * | 12/1984 | Baudot ............... | 250/231.12 |
| 4,515,486 A | 5/1985 | Ide | |
| 4,671,650 A | 6/1987 | Hirzel et al. | |
| 4,711,125 A | 12/1987 | Morrison | |
| 4,723,735 A | 2/1988 | Eisenhaure et al. | |

(Continued)

FOREIGN PATENT DOCUMENTS

GB          866473          4/1961

(Continued)

OTHER PUBLICATIONS

"The Tracking Cube: A Three-Dimensional Input Device", IBM Technical Disclosure Bulletin, IBM Corp., NY, US, vol. 32, No. 3B, Aug. 1, 1989, pp. 91-95.

(Continued)

*Primary Examiner*—Michael J. Zanelli
(74) *Attorney, Agent, or Firm*—Fogg & Powers LLC

(57) ABSTRACT

A contact free optical position sensor for an inertial reference system. The surface of an inertial sensor assembly is adapted with a coordinate encoded pattern. One or more optical sensors are adapted to generate image signals of the coordinate encoded pattern of the spherical inertial sensor assembly. A controller is coupled to receive the image signals from the optical sensors and adapted to apply a decoding algorithm to each image signal. The decoding algorithm determines the coordinates of the inertial sensor assembly images captured by each optical sensor and calculates the angular position of the inertial sensor assembly.

27 Claims, 8 Drawing Sheets

U.S. PATENT DOCUMENTS

| | | |
|---|---|---|
| 4,917,330 A | 4/1990 | Dulat et al. |
| 5,067,084 A | 11/1991 | Kau |
| 5,088,825 A | 2/1992 | Derry et al. |
| 5,099,430 A | 3/1992 | Hirsch |
| 5,319,577 A | 6/1994 | Lee |
| 5,357,437 A | 10/1994 | Polvani |
| 5,396,326 A | 3/1995 | Knobbe et al. |
| 5,710,559 A | 1/1998 | Krogmann |
| 5,894,323 A | 4/1999 | Kain et al. |
| 6,172,665 B1 | 1/2001 | Bullister |
| 6,481,672 B1 | 11/2002 | Goodzeit et al. |
| 6,594,623 B1 | 7/2003 | Wang et al. |
| 6,594,911 B2 | 7/2003 | Brunstein et al. |
| 6,629,778 B1 | 10/2003 | Enderle et al. |
| 6,741,209 B2 | 5/2004 | Lee |
| 6,826,478 B2 | 11/2004 | Riewe et al. |
| 7,003,399 B1 | 2/2006 | Chappell |
| 2002/0077189 A1 | 6/2002 | Tuer et al. |
| 2003/0120425 A1 | 6/2003 | Stanley et al. |
| 2004/0015323 A1 | 1/2004 | Boyton |
| 2004/0075737 A1 | 4/2004 | Kirby |
| 2004/0089083 A1 | 5/2004 | Bailey |
| 2004/0212803 A1 | 10/2004 | Siegl et al. |

FOREIGN PATENT DOCUMENTS

| | | |
|---|---|---|
| GB | 878939 | 10/1961 |
| GB | 1015681 | 1/1966 |
| GB | 1284195 | 8/1972 |
| GB | 2166920 | 5/1986 |
| WO | 9505547 | 2/1995 |
| WO | 2004023150 | 3/2004 |

OTHER PUBLICATIONS

Benbasat, "An Inertial Measurement Unit for User Interfaces", Sep. 8, 2000, pp. 1-100, Publisher: Massachusetts Institute of Technology, Published in: MA, USA.

El-Sheimy et al., "Structural Monitoring Using Wirelessly Connected MEMS-Based Sensors: Towards System Development", Feb. 18, 2003, pp. 1-10, Publisher: ICPCM, Published in: Cairo, Egypt.

NG, "The Optical Mouse as a Two-Dimensional Displacement Sensor", "Sensors and Actuators A", Oct. 1, 2003, pp. 21-25, vol. 107, No. 1, Publisher: Elseveier Sequoia S.A., Published in: Lausanne, CH.

* cited by examiner

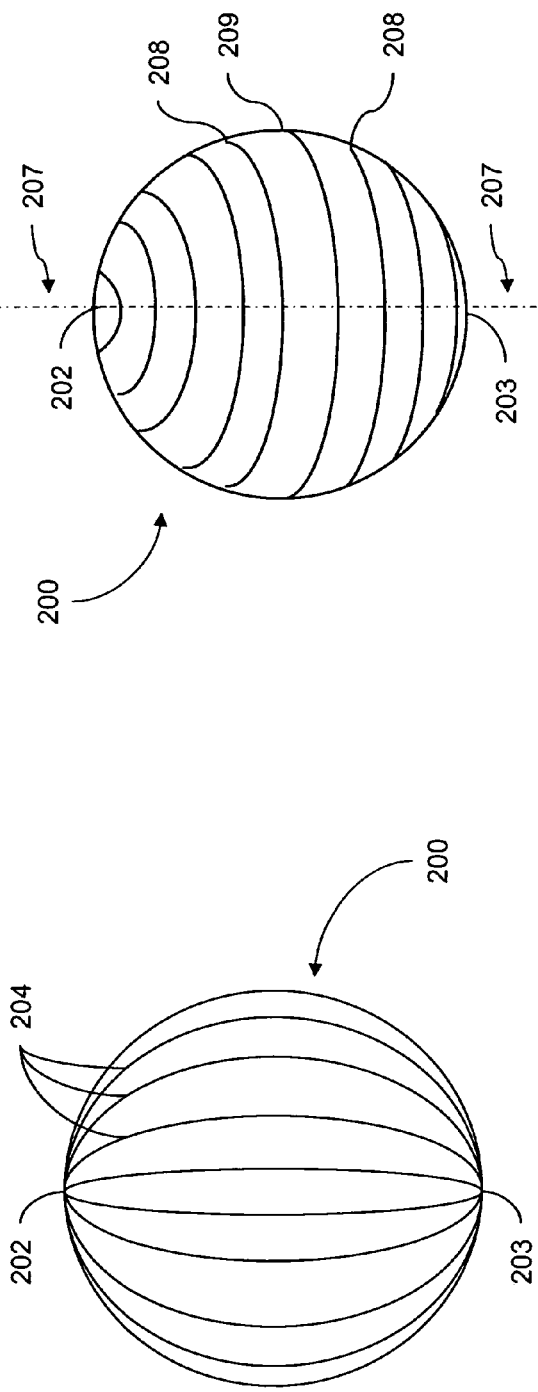
Fig. 2b Parallel lines
Fig. 2a Meridian lines
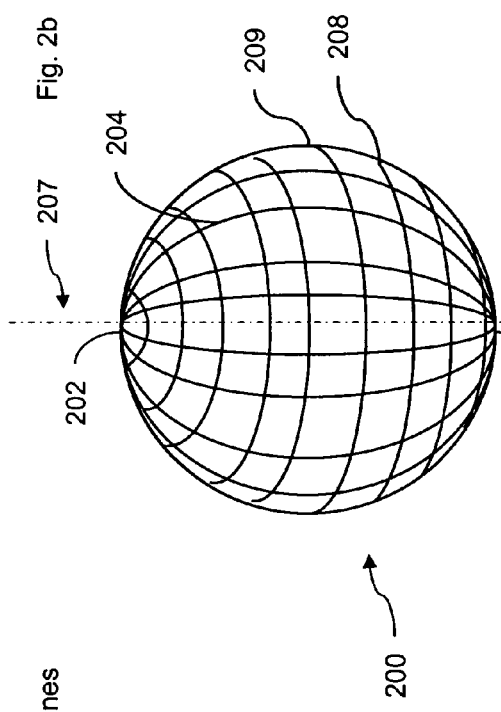
Fig. 2c Double circle series pattern of meridian and parallel lines

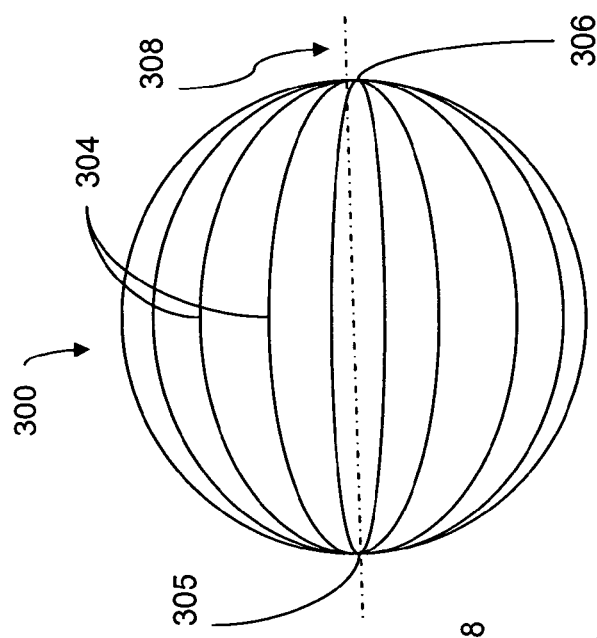
Fig. 3b Series of Meridian lines
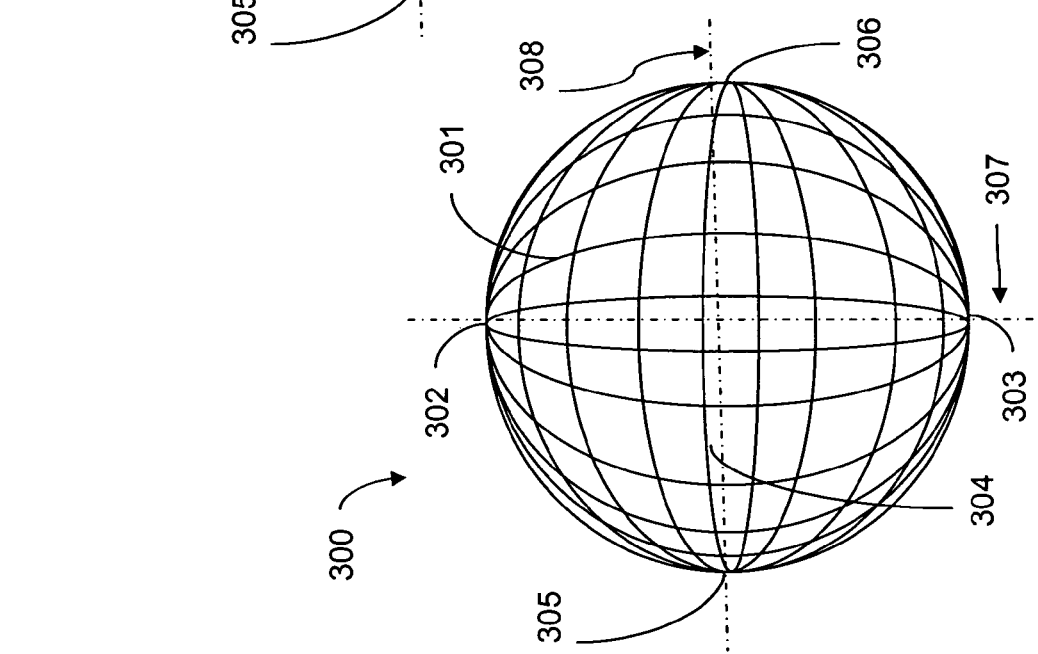
Fig. 3c Double circle series pattern of two series of Meridian lines
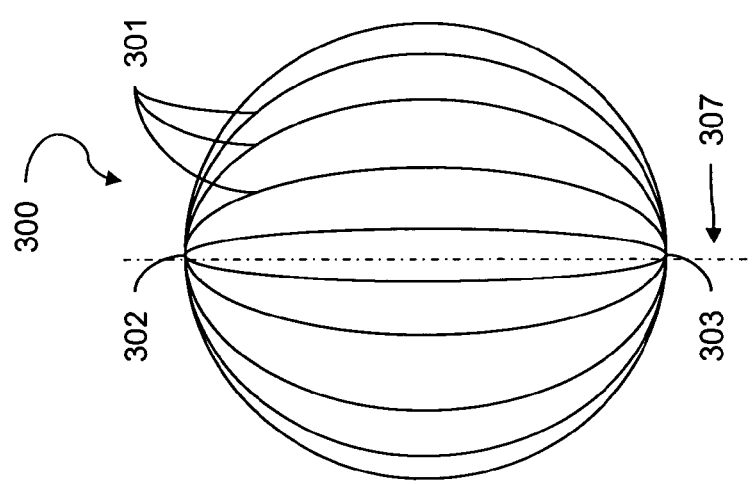
Fig. 3a Series of Meridian lines

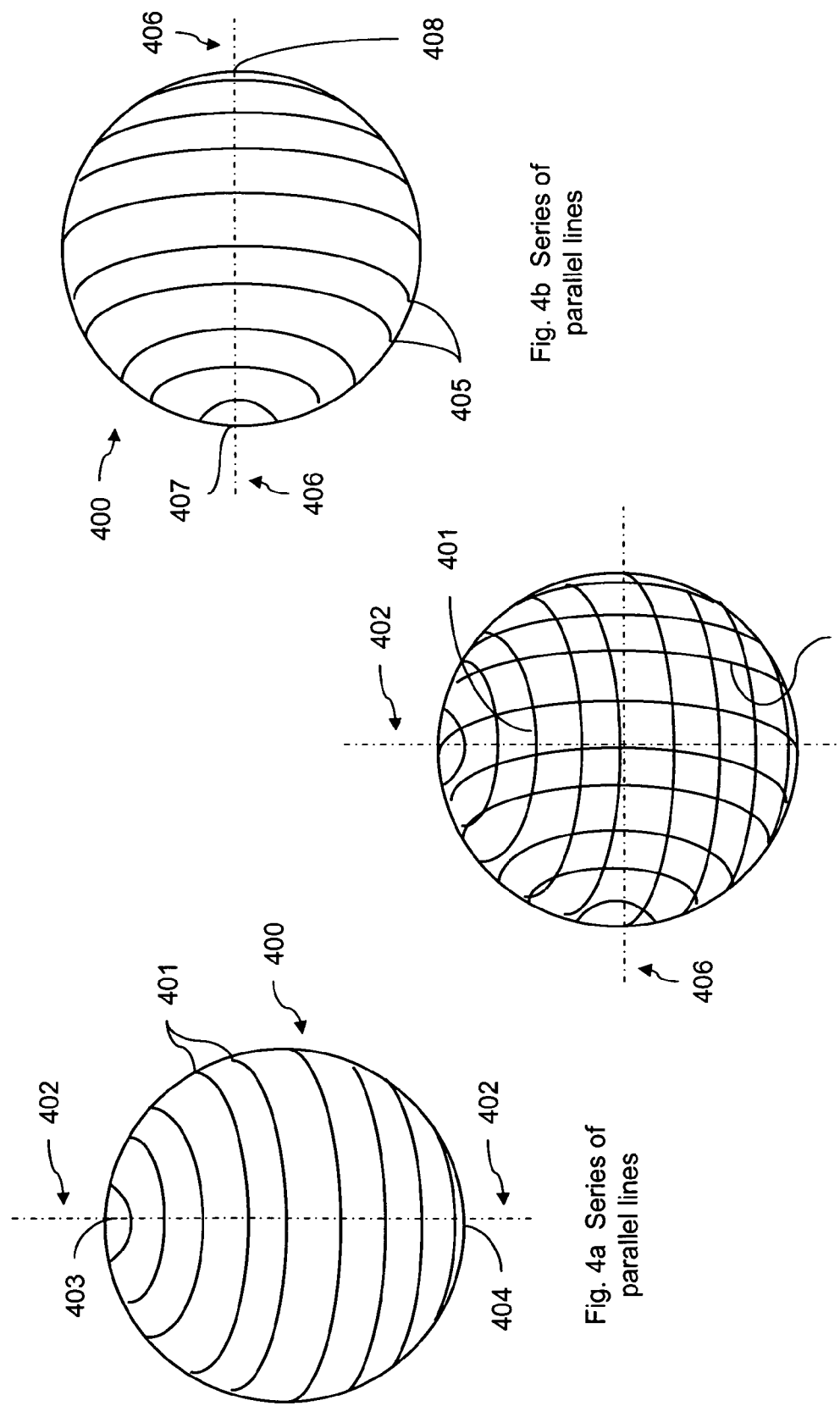
Fig. 4b Series of parallel lines
Fig. 4c Double circle series pattern of two series of parallel lines
Fig. 4a Series of parallel lines

SPHERICAL POSITION MONITORING SYSTEM

CROSS REFERENCE TO RELATED APPLICATIONS

This application is related to co-pending U.S. patent application Ser. No. 11/004,184, filed on Dec. 3, 2004, filed on even date herewith and entitled "GAS SUPPORTED INERTIAL SENSOR SYSTEM AND METHOD". The '184 Application is incorporated herein by reference.

This application is also related to the following applications filed on even date herewith, all of which are hereby incorporated herein by reference:

U.S. patent application Ser. No. 11/004,759, filed on Dec. 3, 2004, entitled "ABSOLUTE POSITION DETERMINATION OF A OBJECT USING PATTERN RECOGNITION,";

U.S. patent application Ser. No. 11/004,743, filed on Dec. 3, 2004, entitled "PRECISE, NO-CONTACT, POSITION SENSING USING IMAGING,";

U.S. patent application Ser. No. 11/004,529, filed on Dec. 3, 2004, entitled "THREE DIMENSIONAL BALANCE ASSEMBLY,";

U.S. patent application Ser. No. 11/004,452, filed on Dec. 3, 2004, entitled "ARTICULATED GAS BEARING SUPPORT PADS,";

U.S. patent application Ser. No. 11/004,214, filed on Dec. 3, 2004, entitled "GAS JET CONTROL FOR INERTIAL MEASUREMENT UNIT,";

U.S. patent application Ser. No. 11/004,177, filed on Dec. 3, 2004, entitled "RF WIRELESS COMMUNICATION FOR DEEPLY EMBEDDED AEROSPACE SYSTEMS,"; and U.S. patent application Ser. No. 11/004,517, filed on Dec. 3, 2004, entitled "GENERALIZED INERTIAL MEASUREMENT ERROR REDUCTION THROUGH MULTIPLE AXIS ROTATION DURING FLIGHT,".

TECHNICAL FIELD

The present invention generally relates to the field of positioning sensors and in particular to contact free optical position sensing for inertial reference systems.

BACKGROUND

Precision inertial navigation systems typically require concentric sets of ball bearing supported gimbals which allow instruments to freely rotate in flight maneuvers and allow them to be manipulated for calibration. The embodiments of the previously referenced '184 Application, which is herein incorporated by reference, eliminate the need for gimbals and ball bearings by supporting the inertial sensor assembly with a spherically shaped gas bearing. The gas bearing allows rotation of the inertial sensor assembly in all axes with no wear due to contact between rotating surfaces. During the flight of a craft, the angular position of the inertial sensor assembly (sometimes also referred to as the attitude, or roll, pitch and yaw of the inertial sensor assembly) relative to the frame of the craft must be monitored at all times. However, because physical contact with the freely rotating, gas bearing supported, inertial sensor assembly is undesirable, the need arises to sense the position of the inertial sensor assembly without physical contact between the sensor and the assembly.

A typical globe of the Earth is one example of a three dimensional object that allows a user to readily identify coordinates on its surface by marking a visual coordinate system on its surface. The surface of a globe is first marked by a series of evenly space meridian lines running from the north pole to the south pole. These meridian lines establish the longitude coordinate of a point of interest. The surface of the globe is also marked by a series of parallel circles running east and west along the surface of the globe. Parallel lines establish the latitude coordinate of a point of interest. To identify the coordinates of any point on the globe, a user need only observe numerical markings printed on the two closest marked longitude and latitude lines and interpolate the coordinates of their point in interest. While a marking system with printed numerals allows a person to accurately identify the coordinates for any place on a globe, it is not optimized for real time dynamic control systems such as an inertial navigation system.

For the reasons stated above and for other reasons stated below which will become apparent to those skilled in the art upon reading and understanding the specification, there is a need in the art for a contact free means to determine the angular position of a spherical object.

SUMMARY

The embodiments of the present invention address the problem of sensing and measuring the angular position of a sphere, where physical contact with the sphere is undesirable, through a coordinate encoded pattern, as well as other problems and will be understood by reading and studying the following specification.

In one embodiment, an angular position detection system for a sphere is disclosed. One or more optical sensors each generate image signals of a coordinate encoded surface pattern on a spherical object. A controller is coupled to receive the image signals from the optical sensors, and adapted to apply a decoding algorithm to each image signal. The decoding algorithm determines the coordinates of the surface of the sphere captured in the image signals by each optical sensor. The controller then calculates the angular position of the sphere.

In another embodiment, an angular position detection system for an inertial navigation system is disclosed. One or more optical sensors are adapted to generate image signals of the surface of a spherical inertial sensor assembly. The surface of the spherical inertial sensor assembly is adapted with a coordinate encoded pattern. A controller is coupled to receive the image signals from one or more optical sensors and adapted to apply a decoding algorithm to each image signal. The decoding algorithm determines the coordinates of the surface of the inertial sensor assembly captured in the image signals by each optical sensor. The controller further calculates the angular position of the inertial sensor assembly.

In another embodiment, a method of determining the orientation of a sphere is disclosed. The method comprising capturing one or more images of a surface of a sphere having a coordinate encoded pattern thereon and applying a decoding algorithm to the coordinate encoded pattern captured in the one or more images to determine the surface location of the sphere.

In another embodiment, a method for determining the angular position of a rotating sphere is disclosed. The method comprising applying a coordinate encoded pattern to the surface of the sphere, simultaneously capturing one or more images of different locations of the sphere, decoding the images to determine the coordinates and rotational angle of the sphere appearing in each image, and calculating the angular position of the sphere based on the coordinates and rotational angles determine by the images.

In still another embodiment, a method for determining the angular position of an inertial sensor assembly is disclosed. The method comprising applying a coordinate encoded pattern to the surface of the inertial sensor assembly, simultaneously capturing one or more images of different locations of the inertial sensor assembly, analyzing the images to decode the coordinates and rotational angle of the inertial sensor assembly appearing in each image, calculating the angular position of the inertial sensor assembly based on the coordinates and rotational angles determine by the images.

In another embodiment, a method for determining the angular position of an inertial sensor assembly is disclosed. The method comprising simultaneously capturing a first image of the inertial sensor assembly and a second image of the inertial sensor assembly, where the first image and second image capture different locations on the surface of the inertial sensor assembly, analyzing the first image to decode the coordinate encoded pattern imaged and to determine the location and rotational angle of the inertial sensor assembly appearing in the first image, and analyzing the second image to decode the coordinate encoded pattern imaged and to determine the location and rotational angle of the inertial sensor assembly appearing in the second image.

In yet another embodiment, a method for determining the angular position of a rotating sphere having a coordinated encoded surface pattern, where the method is embedded in a computer-readable medium is disclosed. The method comprising simultaneously capturing one or more images of the sphere from different locations on the sphere, processing each image through a decoding algorithm to determine the coordinates of the sphere appearing each image, and calculating the angular position of the sphere based on the coordinates determined by the images

DRAWINGS

The present invention can be more easily understood and further advantages and uses thereof more readily apparent, when considered in view of the description of the preferred embodiments and the following figures in which:

FIGS. 2a, 2b and 2c are diagrams illustrating a double circle series pattern of one embodiment of the present invention;

FIGS. 3a, 3b and 3c are diagrams illustrating another double circle series pattern of one embodiment of the present invention;

FIGS. 4a, 4b and 4c are diagrams illustrating another double circle series pattern of one embodiment of the present invention;

In accordance with common practice, the various described features are not drawn to scale but are drawn to emphasize features relevant to the present invention. Reference characters denote like elements throughout Figures and text.

DETAILED DESCRIPTION

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense.

As stated above, the embodiments of the commonly assigned '184 Application, which is herein incorporated by reference, eliminate the need for gimbals and ball bearings by supporting the inertial sensor assembly with a spherically shaped gas bearing. However, because the gas bearing eliminates physical reference points provided by the gimbals, and because physical contact with the freely rotating inertial sensor assembly is undesirable, the need arises to sense the angular position of the inertial sensor assembly, without physical contact between the sensor and the assembly. Embodiments of the present invention address the problems of contact free position sensing for a sphere by incorporating a coordinate encoded pattern on the surface of the sphere.

Figure 1A:
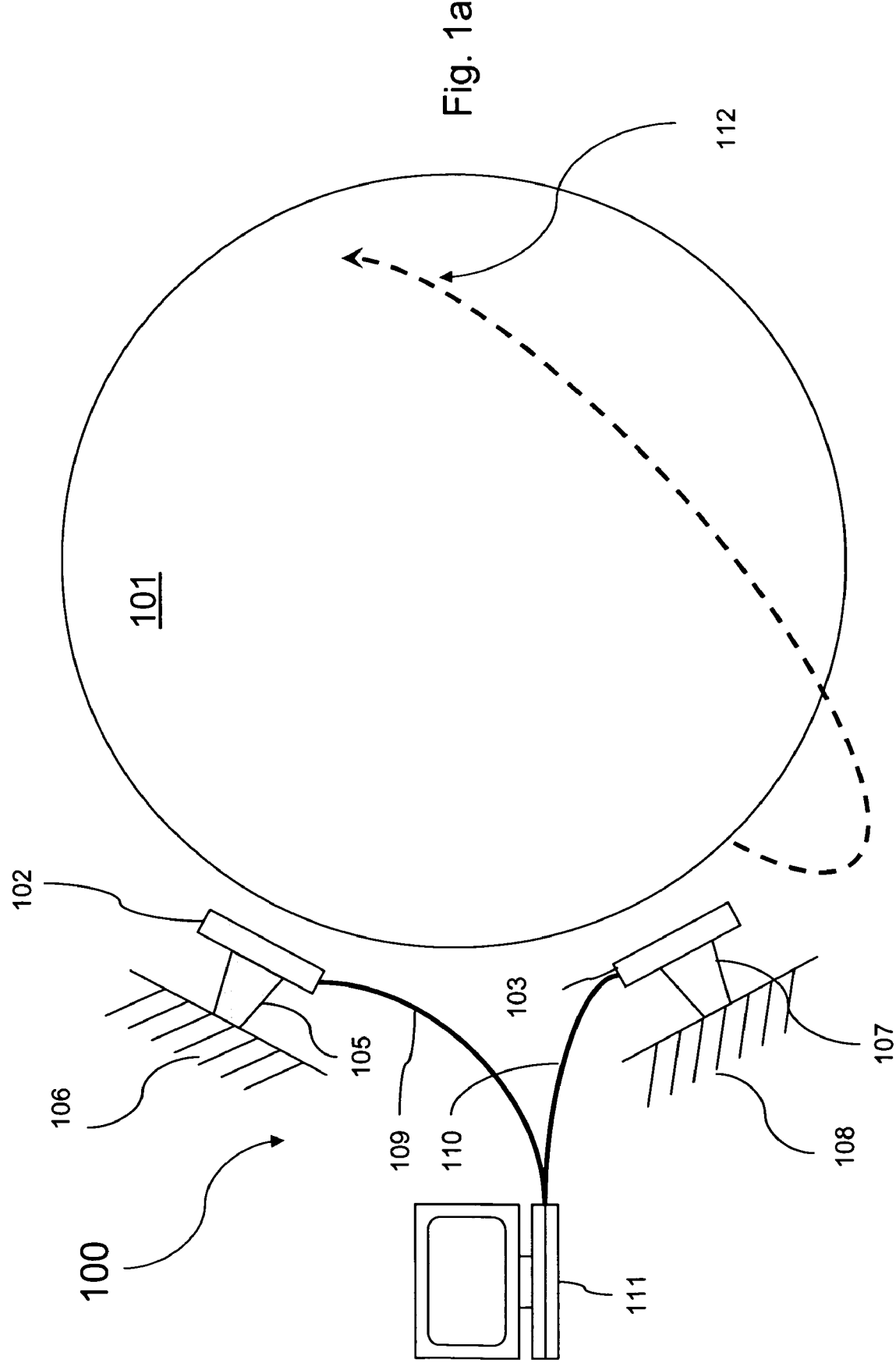
FIGS. 1a and 1b are diagrams illustrating an angular position detection system of one embodiment of the present invention.

In FIG. 1a, a position detection system 100 of one embodiment of the present invention is illustrated. A first optical sensor 102 is solidly attached through a mounting bracket 105 to a fixed reference position 106 and aimed at a spherical object 101 having a coordinate encoded pattern applied to its surface. A second optical sensor 103 is solidly attached through a mounting bracket 107 to a fixed reference position 108 and aimed at the spherical object 101. The outputs of the first optical sensor 102 and second optical sensor 103 are in communication with a controller 111 via communication links 109 and 110. Reference number 112 generally illustrates an example of a rotational motion of the object 101. The first optical sensor 102 captures a first image of the object and communicates the first image to the controller 111. The second optical sensor 103 simultaneously captures a second image of the object and communicates the second image to the controller 111. The controller 111 analyzes the first image features to decode the coordinates of the object currently in the view of the first optical sensor. The controller 111 analyzes the second image features to decode the coordinates of the object currently in the view of the second optical sensor. The controller then calculates the angular position of the object based on the coordinates observed by the two optical sensors held at fixed reference positions.

Figure 1B:
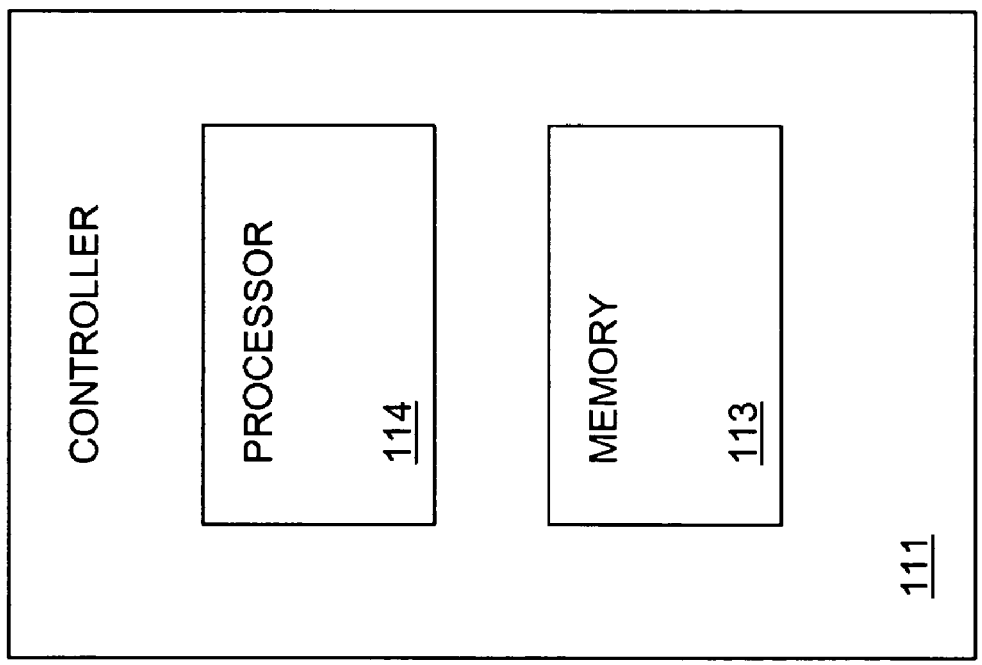

Although the figures in this specification illustrate the use of a computer as a controller, as illustrated in FIG. 1b, any type of controller 111 having a memory 113, and a processor 114 that is adapted to match the images taken by optical sensors with a coordinate on the sphere, and calculate the angular position of the sphere, can be used. Although the present invention was developed to determine the position of a freely moving sphere, the present invention may be used to determine the position of any moving object with a coordinate encoded pattern.

FIGS. 2(a-c), 3(a-c) and 4(a-c) illustrate embodiments of the current invention where the coordinate encoded pattern of a sphere comprises a double circle series pattern. In FIGS. 2a, 2b and 2c, an embodiment of one coordinate encoded pattern is illustrated. In this embodiment, the coordinate encoded double circle series pattern comprises two series of circles drawn on the surface of a sphere 200. In FIG. 2a, the first series of circles are great circles, all of which intersect on the sphere at only two points 202 and 203. The two intersection points 202 and 203 define two poles of the sphere. The lines created by the circles on the surface of the sphere, starting from the first pole 202 and ending at the second pole 203, define a first series of lines called meridians 204. In FIG. 2b, the second series of circles are several small circles 208 and one great circle 209. These circles 208 and 209 are all co-centric with the axis line 207 which is shown connecting the two poles 202 and 203. Moreover, these circles 208 and 209 create a second series of parallel lines along the surface of the sphere 200. In this embodiment, the axis line (not shown) created by the poles 202 and 203 of the first series of circles 204 is aligned with axis 207 of the second series of circles 208 and 209 so that lines of the first series intersect perpendicularly with the lines of the second series.

In FIGS. 3a, 3b, and 3c, another embodiment of a coordinate encoded double circle series pattern is illustrated. The coordinate encoded double circle series pattern comprises two series of circles drawn on the surface of a sphere 300. In FIG. 3a, the first series of circles creates a series of meridian lines 301 which intersect at two poles, a first pole 302 and a second pole 303. In FIG. 3b, the second series of circles creates a second series of meridian lines 304 which intersect at two poles, 305 and 306, wherein the axis line 307 connecting the poles of the first series is orthogonal the axis line 308 connecting the poles of the second series, as illustrated in FIG. 3c.

In FIGS. 4a, 4b, and 4c, another embodiment of a coordinate encoded double circle series pattern is illustrated. The coordinate encoded double circle series pattern comprises two series of circles drawn on the surface of a sphere 400. In FIG. 4a, the first series of circles creates a series of parallel lines 401 on the surface of the sphere, each co-centric with an axis 402 connecting a first pole 403 and a second pole 404. In FIG. 4b, the second series of circles creates a second series of parallel lines 405, each co-centric with an axis 406 connecting a first pole 407 and a second pole 408, wherein the axis 402 connecting the poles of the first series is orthogonal to the axis 407 connecting the poles of the second series, as illustrated in FIG. 4c.

For embodiments using the double circle series coordinate encoded patterns illustrated in FIGS. 2(a-c), 3(a-c), or 4(a-c), coordinates are encoded onto the surface of the sphere by varying the thickness of the parallel series lines and/or meridian series lines drawn on the surface. In one embodiment, starting with a reference meridian, the thickness of meridian series lines drawn on the surface to define each meridian line, gradually increases with each successive line, going around the sphere from 0 degrees to 360 degrees, where the reference meridian line is again reached. For parallel series lines, starting at the poles and working towards the equator, the thickness of each parallel series line drawn on the surface gradually increases from one parallel to the next. Several means are available for marking the sphere which allow the controller to distinguish first series lines from second series lines. In one embodiment, all first series lines can be an even number thickness, e.g. 0.004, 0.006, 0.008, etc., while the second series lines could be an odd number thickness, 0.005, 0.007, 0.009, etc. In another embodiment, the first series lines could be a different style than the second series lines, such as dashed lines versus solid lines. In still another embodiment, the first and second series lines could be distinguished by color. To decode the coordinates of an image captured by the first optical sensor, the controller is adapted to determine the widths of the intersecting lines, and the rotational angle of the lines in the image. The image captured by the second optical sensor is also decoded by the controller by determining the widths of each of two intersecting lines, and the angle of the lines in the image.

By decoding the positions of two points on the sphere, the controller can fully determine the three degrees of the angular position of the sphere (i.e. the roll, pitch and yaw). To determine the angular position of the sphere from the two decoded coordinates, the angular distance between the present location of the pattern features on the sphere and the location of the pattern features when the sphere was in a home (i.e. rest) position must be determined. When the sphere, and the reference pattern features are in the home position, the angular coordinates of yaw, pitch, and roll are defined as zero. As the sphere rotates from the home position, the angular distances between the current location of pattern features and the home location of those features increases. The angular coordinates of yaw, pitch and roll, of the sphere change as a function of the angular distances.

Figure 5:
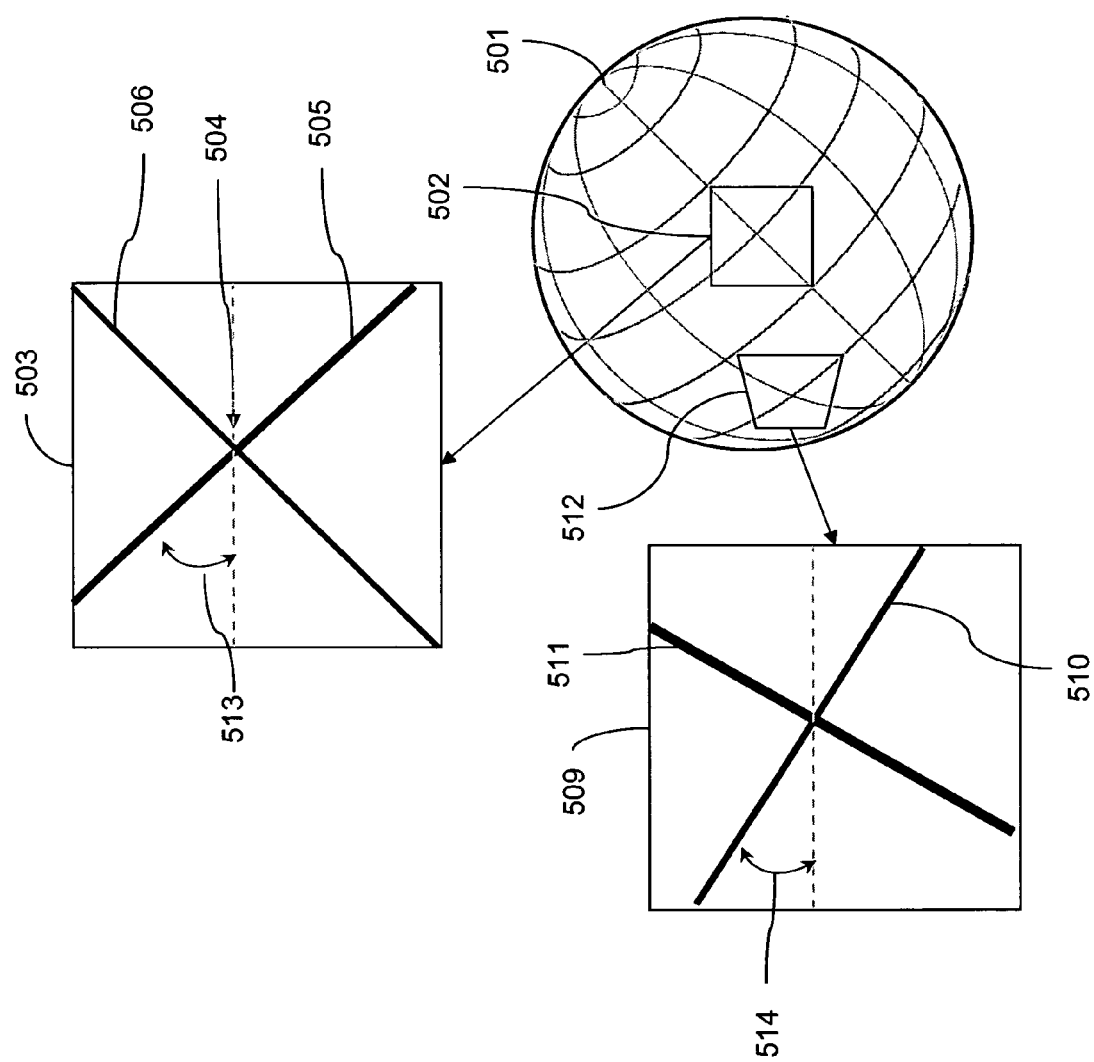
FIG. 5 is a diagram illustrating the decoding of a double circle series coordinate encoded pattern of one embodiment of the present invention.

In FIG. 5, decoding of one embodiment of a double circle series coordinate encoded pattern is illustrated. A first image 503 captures surface pattern features of an area observed 502 of a sphere 501. From the first image 503, a controller identifies the intersection 504 of a red line 505 and a green line 506. Further, the controller measures the width of the red line 505 (e.g. 5 mm) and the green line 506 (e.g. 3 mm). The controller then references a table in memory which provides the coordinates 507 of the point on the sphere 501 where red 5 mm line and the green 3 mm line intersect. Table 1 illustrates one embodiment of such a table in memory for correlating line width and color data gathered by the controller with surface coordinates on the sphere 501.

TABLE 1

| Red Line (m) | $\phi$ | Green Line (m) | $\theta$ |
|---|---|---|---|
| ... | ... | ... | ... |
| .002 | $+3\pi/8$ | .002 | $\pi/10$ |
| .003 | $+\pi/3$ | .003 | $\pi/5$ |
| .004 | $+\pi/4$ | .004 | $3\pi/10$ |
| .005 | $+\pi/6$ | .005 | $2\pi/5$ |
| .006 | $+\pi/8$ | .006 | $\pi/2$ |
| ... | ... | ... | ... |

Under the first column, the controller looks up a red line with a width of 0.005 m which correlates in the second column to a first coordinate $\phi$ of $+\pi/6$. Under the third column, the controller looks up a green line having a width of 0.003 m which correlates in the fourth column to a second coordinate $\theta$ of $\pi/5$. From a second image 509, capturing surface pattern features of another area 512 of the sphere 501, the controller further measures the width of another set of intersecting red and green lines, 510 and 511, and determines the coordinate of the point by referencing the table in memory. The coordinates of the imaged areas of the sphere indicate how far the sphere has moved from its home position. The use of two points captured from at least two reference locations avoids the possibility that the sphere is rotated exactly 180 degrees. The roll, pitch and yaw of the sphere is a function of the coordinates of the two imaged areas, which one skilled in the art will understand how to calculate. In another embodiment, the angular orientation 513 and 514 of one or more of the images is also measured by the controller for the purpose of calculating the roll, pitch and yaw of the sphere.

In another embodiment, the initial home position can be defined by whatever arbitrary initial rotational position the sphere has and the table recalibrated accordingly. The initial rotational position is defined as the new home position where yaw, pitch and roll are zero. To recalibrate the controller for the new home position, two images are captured of the sphere. Based on the coordinates of the images as determined by the reference table, the algorithm used to calculate roll, pitch, and yaw is adjusted accordingly.

The exact number of first and second series lines that must be drawn on the spherical surface increases as greater degrees of precision are required by an application. Also regarding the lines, the minimum degree of increased thickness required from one line to the next will depend on the resolution of the optical sensor that is used. Given these two considerations, in some embodiments it may be preferable for the lines in a series to increase in thickness over a smaller fraction of the sphere, and then repeat the increasing thickness pattern again for the remaining fractions of the sphere. In these embodiments, it would be necessary to add another visual differentiator to the sphere, such as a background color that is lighter or darker than the lines, for the controller to determine where on the sphere the optical sensor was observing.

Embodiments of the current invention can include the decoding of images from a single optical sensor, or two or more optical sensors. In single optical sensor embodiments, the controller may be adapted to possess accurate prior knowledge of the previous rotational position of the object and in its calculations assume that the object did not flip 180 degrees in the time elapsed between two consecutive images. A single sensor can only be used where there is no translation expected between the sphere and the mount of the optical sensor. In the case where translation is experienced, a second sensor can be used to distinguish between pure rotation and pure translation.

Figure 6:
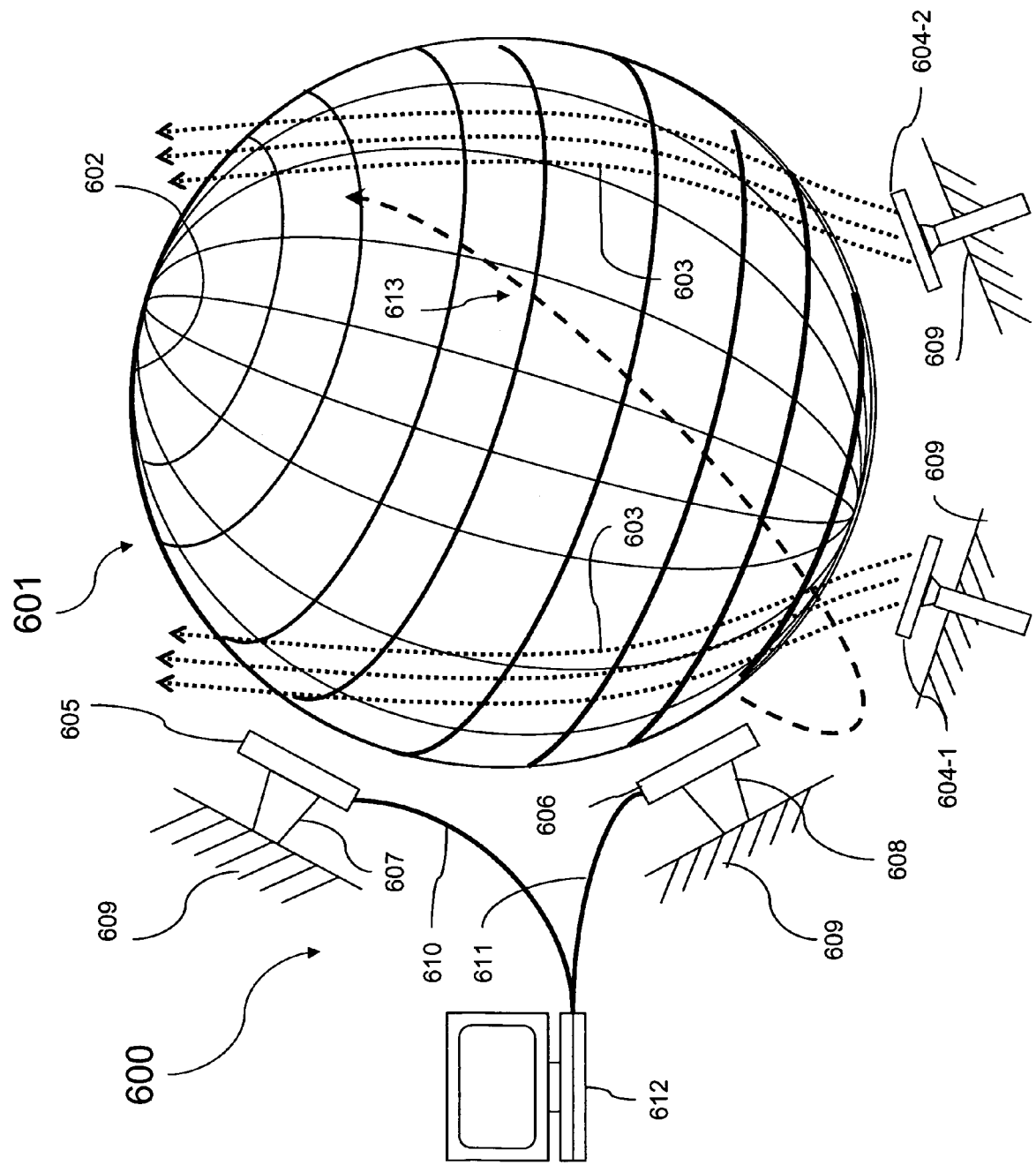
FIG. 6 is a diagram illustrating an angular position detection system of one embodiment of the present invention.

In FIG. 6, a position detection system 600, in combination with the Gas Supported Inertial Sensor Assembly 601, of one embodiment of the present invention is illustrated. A gas supported inertial navigation system (INS) 601 utilizes a freely rotating spherically shaped inertial sensor assembly (ISA) 602. The ISA is supported, or floats, within a spherically shaped gas bearing 603 generated by a plurality of gas pads 604-1 and 604-2. (Although only two gas pads are shown in FIG. 6, it will be understood in the art that more than two gas pads can be used to achieve the desired result). Pressurized gas is applied to the gas pads 604-1 and 604-2 and the supported ISA 602 rides on a cushion of gas with little or no contact between the ISA and the gas pads. The nearly frictionless gas bearing 603 (i.e. flow of gas 203) allows the ISA 602 to rotate on all axes. Reference number 613 generally illustrates an example of a rotational motion of the sphere 601. In this embodiment, a first optical sensor 605 and a second optical sensor 606 are each secured by a mounting bracket 607 and 608 to the outer shell assembly 609 of the INS 601. Additional details regarding the gas bearing 603, gas pads 604, the INS 601, and the ISA 602 are found in the '184 Application herein incorporated by reference. In this embodiment, a double circle series pattern is applied to the surface of the ISA 602. The output of the first optical sensor 605 and second optical sensor 606 are in communication with a controller 612 via communication links 610 and 611. The first optical sensor 605 captures a first image of the ISA 602 and communicates the first image to the controller 612. The second optical sensor 606 simultaneously captures a second image of the ISA 602 and communicates the second image to the controller 612. The controller 612 analyzes the first image, identifies the intersection of a first series line and a second series line, decodes the coordinates of the ISA 602 currently in the view of the first optical sensor by measuring the thickness of the intersecting lines, and measures the angular rotation of the lines in the first image. Further, the controller 612 analyzes the second image, identifies the intersection of a first series line and a second series line, decodes the coordinates of the ISA 602 currently in the view of the second optical sensor by measuring the thickness of the intersecting lines, and measures the angular rotation of the lines in the second image. The controller then calculates the angular position of the ISA 602 based on the coordinates and angular rotation of the lines observed by the two optical sensors.

In some applications of inertial navigation systems, there is a further need to account for translational motion of the inertial sensor assembly during heavy vibration or constant acceleration such as during a missal launch. Translational motion would appear as a rotation to an embodiment with a single optical sensor. For embodiments with two or more optical sensors observing the object, the resulting images from each optical sensor can be compared by the controller to determine the resultant motion.

Figure 7:
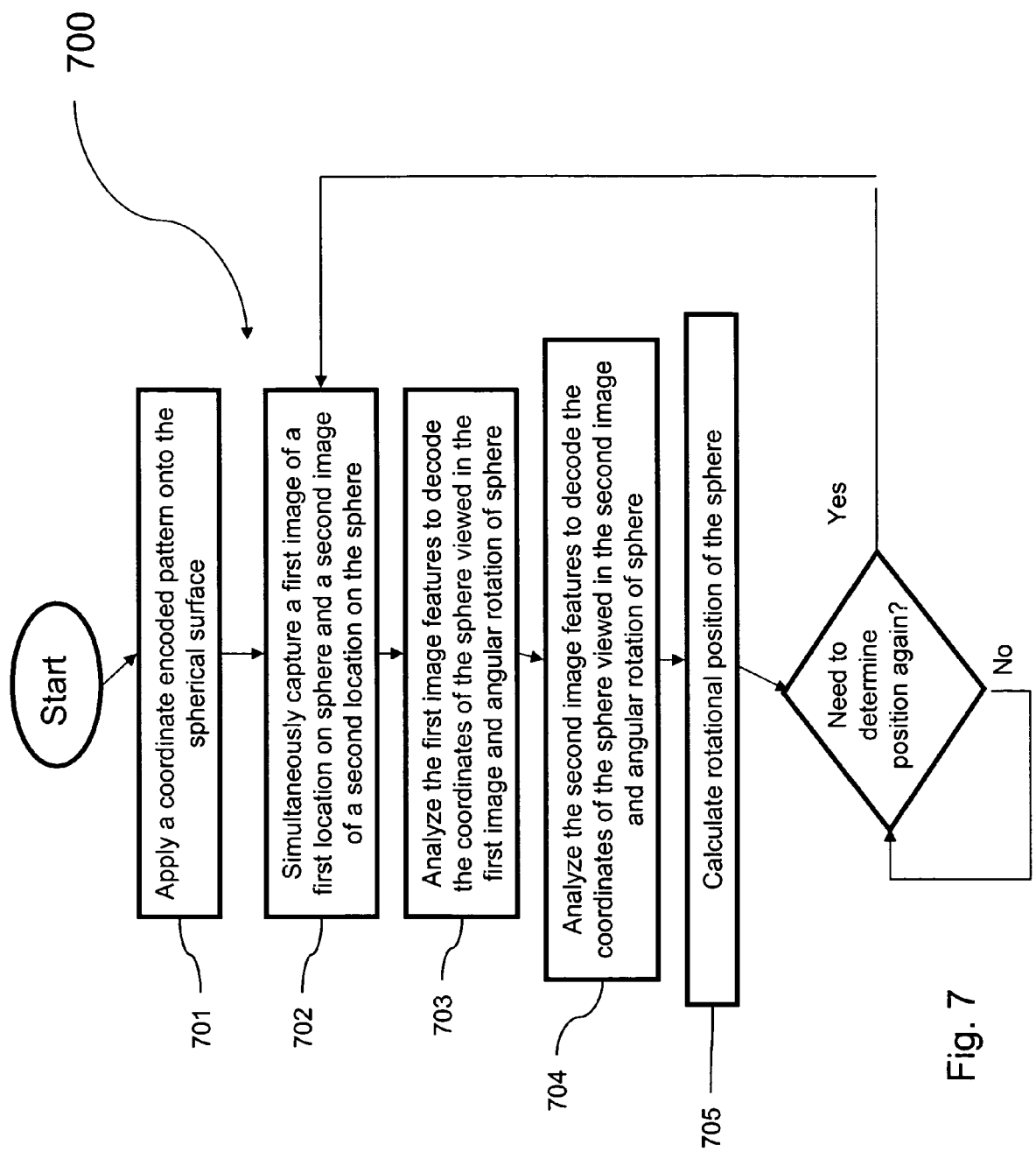
FIG. 7 is a flow chart of a method embodiment of the present invention.

In FIG. 7, a method for determining the angular position of a rotating sphere 700 of an embodiment of the present invention is illustrated. The method first comprises applying a coordinate encoded pattern onto the surface of the sphere (701). To determine the subsequent position of the object at any time, the method further comprises: simultaneously capturing a first image of the sphere and a second image of the sphere from two different locations on the sphere (702); analyzing the first image features to decode the coordinates and rotational angle of the sphere appearing in the first image (703); analyzing the second image features to decode the coordinates and rotational angle of the sphere appearing in the second image (704); calculating the angular position of the sphere based on the coordinates and rotational angles determined by the images (705). To determine the current angular position of the object at any subsequent time, repeat the method beginning with simultaneously capturing a first image of the sphere and a second image of the sphere from two different locations on the sphere (702).

Several means are available to implement the controller element of the current invention. These means include, but are not limited to, digital computer systems, programmable controllers, or field programmable gate arrays. Therefore other embodiments of the present invention are program instructions resident on computer readable media which when implemented by such controllers, enable the controllers to implement embodiments of the present invention. Computer readable media include any form of computer memory, including but not limited to magnetic disk or tape, CD-ROMs, DVD-ROMs, or any optical data storage system, flash ROM, non-volatile ROM, or RAM.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A position detection system for a sphere comprising:
one or more optical sensors adapted to generate image signals of a coordinate encoded surface pattern on a spherical object; and
a controller coupled to receive the image signals from the one or more optical sensors, the controller having a decoding algorithm adapted to determine the surface location of the sphere based on one or more imaged surface patterns in the image signals;
wherein the coordinate encoded surface pattern includes a double circle series pattern; and
wherein the decoding algorithm determines the location of the surface of the sphere from the one or more images of surface patterns by measuring the thickness of intersecting first series and second series lines.

2. The position detection system of claim 1, wherein the controller is further adapted to calculate the angular position of the sphere.

3. The position detection system of claim 2, further comprising:
one or more housings, each optical sensor located in an associated housing.

4. The position detection system of claim 3, further comprising:
a solid mounting surface, each housing attached to the solid mounting surface.

5. The position detection system of claim 4, wherein the controller is located in one of the housings.

6. The position detection system of claim 2, wherein the spherical object is a spherical inertial sensor assembly for an inertial navigation system.

7. The position detection system of claim 1, wherein the decoding algorithm further determines the location of the surface of the spherical object from the one or more images of surface patterns by measuring the rotational angle of the lines appearing in the image signals.

8. The position detection system of claim 1, wherein the double circle series pattern includes a first series of circles defining a series of meridian lines and a second series of circles defining a series of parallel lines.

9. The position detection system of claim 1, wherein the double circle series pattern includes a first series of circles defining a series of meridian lines and a second series of circles defining a series of meridian lines.

10. The position detection system of claim 1, wherein the double circle series pattern includes a first series of circles defining a series of parallel lines and a second series of circles defining a series of parallel lines.

11. An angular position detection apparatus comprising:
an inertial navigation system including a gas bearing supported spherical inertial sensor assembly, said spherical inertial sensor having a coordinate encoded pattern thereon;
one or more optical sensors adapted to generate image signals of the coordinate encoded pattern on the spherical inertial sensor assembly; and
a controller coupled to receive the image signals from the one or more optical sensors, the controller having a decoding algorithm adapted to determine the surface location of the spherical inertial sensor assembly based on one or more imaged surface patterns in the image signals;
wherein the controller is further adapted to calculate the angular position of the spherical inertial sensor assembly;
wherein the coordinate encoded surface pattern includes a double circle series pattern; and
wherein the decoding algorithm determines the coordinates of the surface of the spherical inertial sensor assembly captured in the image signals by each optical sensor by measuring the thickness of intersecting lines, and the rotational angle of the lines appearing in the image signals.

12. The position detection system of claim 11:
an outer shell assembly enveloping the spherical inertial sensor assembly, the optical sensors attached to the outer shell assembly.

13. An angular position detection apparatus comprising:
an inertial navigation system including a gas bearing supported spherical inertial sensor assembly, said spherical inertial sensor having a coordinate encoded pattern thereon;
one or more optical sensors adapted to generate image signals of the coordinate encoded pattern on the spherical inertial sensor assembly; and
a controller coupled to receive the image signals from the one or more optical sensors, the controller having a decoding algorithm adapted to determine the surface location of the spherical inertial sensor assembly based on one or more imaged surface patterns in the image signals;
wherein the controller is further adapted to calculate the angular position of the spherical inertial sensor assembly;
wherein the coordinate encoded surface pattern includes a double circle series pattern; and
wherein the double circle series pattern includes a first series of circles defining a series of meridian lines and a second series of circles defining a series of parallel lines.

14. An angular position detection apparatus comprising:
an inertial navigation system including a gas bearing supported spherical inertial sensor assembly, said spherical inertial sensor having a coordinate encoded pattern thereon;
one or more optical sensors adapted to generate image signals of the coordinate encoded pattern on the spherical inertial sensor assembly; and
a controller coupled to receive the image signals from the one or more optical sensors, the controller having a decoding algorithm adapted to determine the surface location of the spherical inertial sensor assembly based on one or more imaged surface patterns in the image signals;
wherein the controller is further adapted to calculate the angular position of the spherical inertial sensor assembly;
wherein the coordinate encoded surface pattern includes a double circle series pattern; and
wherein the double circle series pattern includes a first series of circles defining a series of meridian lines and a second series of circles defining a series of meridian lines.

15. An angular position detection apparatus comprising:
an inertial navigation system including a gas bearing supported spherical inertial sensor assembly, said spherical inertial sensor having a coordinate encoded pattern thereon;

one or more optical sensors adapted to generate image signals of the coordinate encoded pattern on the spherical inertial sensor assembly; and a controller coupled to receive the image signals from the one or more optical sensors, the controller having a decoding algorithm adapted to determine the surface location of the spherical inertial sensor assembly based on one or more imaged surface patterns in the image signals;

wherein the controller is further adapted to calculate the angular position of the spherical inertial sensor assembly;

wherein the coordinate encoded surface pattern includes a double circle series pattern; and wherein the double circle series pattern includes a first series of circles having lines of a different color than a second series of circles.

16. An angular position detection apparatus comprising:

an inertial navigation system including a gas bearing supported spherical inertial sensor assembly, said spherical inertial sensor having a coordinate encoded pattern thereon;

one or more optical sensors adapted to generate image signals of the coordinate encoded pattern on the spherical inertial sensor assembly; and a controller coupled to receive the image signals from the one or more optical sensors, the controller having a decoding algorithm adapted to determine the surface location of the spherical inertial sensor assembly based on one or more imaged surface patterns in the image signals;

wherein the controller is further adapted to calculate the angular position of the spherical inertial sensor assembly;

wherein the coordinate encoded surface pattern includes a double circle series pattern; and wherein the double circle series pattern includes a first series of circles having lines of a different style than a second series of circles.

17. A method for determining the angular position of an inertial sensor assembly, the method comprising:

applying a coordinate encoded pattern to the surface of the inertial sensor assembly;

simultaneously capturing one or more images of the inertial sensor assembly, where each image captures a different surface location on the inertial sensor assembly;

calculating the angular position of the inertial sensor assembly based on the surface location and rotational angles in the captured images; and looking up the captured intersecting lines in a table to determine the surface locations of the points of intersection.

18. A method for determining the angular position of an inertial sensor assembly, the method comprising:

simultaneously capturing a first image of the inertial sensor assembly and a second image of the inertial sensor assembly, where the first image and second image capture different locations on the surface of the inertial sensor assembly;

analyzing the first image to decode the coordinate encoded pattern imaged and to determine the location and rotational angle of the inertial sensor assembly appearing in the first image;

analyzing the second image to decode the coordinate encoded pattern imaged and to determine the location and rotational angle of the inertial sensor assembly appearing in the second image;

calculating the angular position of the inertial sensor assembly based on the surface location and rotational angles in the captured images;

wherein the coordinate encoded surface pattern includes a double circle series pattern; and wherein the double circle series pattern further comprises a first circle series having lines of a different color from a second circle series.

19. A method for determining the angular position of an inertial sensor assembly, the method comprising:

simultaneously capturing a first image of the inertial sensor assembly and a second image of the inertial sensor assembly, where the first image and second image capture different locations on the surface of the inertial sensor assembly;

analyzing the first image to decode the coordinate encoded pattern imaged and to determine the location and rotational angle of the inertial sensor assembly appearing in the first image;

analyzing the second image to decode the coordinate encoded pattern imaged and to determine the location and rotational angle of the inertial sensor assembly appearing in the second image;

calculating the angular position of the inertial sensor assembly based on the surface location and rotational angles in the captured images;

wherein the coordinate encoded surface pattern includes a double circle series pattern; and wherein the double circle series pattern further comprises a first circle series having different style lines from a second circle series.

20. A method for determining the angular position of an inertial sensor assembly, the method comprising:

simultaneously capturing a first image of the inertial sensor assembly and a second image of the inertial sensor assembly, where the first image and second image capture different locations on the surface of the inertial sensor assembly;

analyzing the first image to decode the coordinate encoded pattern imaged and to determine the location and rotational angle of the inertial sensor assembly appearing in the first image;

analyzing the second image to decode the coordinate encoded pattern imaged and to determine the location and rotational angle of the inertial sensor assembly appearing in the second image;

recognizing intersecting lines in the coordinate encoded pattern captured in the first and second images; and measuring the respective thickness of the intersecting lines and the rotational angle of the intersecting lines appearing in the images.

21. The method of claim 20, wherein analyzing the first image and second image to decode the coordinate encoded pattern imaged further comprises:

comparing the measured widths of the respective lines with widths stored in a table.

22. The method of claim 20, wherein analyzing the first image and second image to decode the coordinate encoded pattern imaged further comprises:

determining the respective colors of the intersecting lines appearing in the first image and second image.

23. The method of claim 22, wherein analyzing the first image and second image to decode the coordinate encoded pattern imaged further comprises:

comparing the widths and colors of the respective lines with widths and colors stored in a table.

24. The method of claim 20, wherein analyzing the first image and second image to decode the coordinate encoded pattern imaged further comprises:
determining the respective style of the intersecting lines appearing in the image signal.

25. The method of claim 23, wherein analyzing the first image and second image to decode the coordinate encoded pattern imaged further comprises:
comparing the widths and styles of the respective lines with widths and colors stored in a table.

26. A method for determining the angular position of an inertial sensor assembly, the method comprising:
simultaneously capturing a first image of the inertial sensor assembly and a second image of the inertial sensor assembly, where the first image and second image capture different locations on the surface of the inertial sensor assembly;
analyzing the first image to decode the coordinate encoded pattern imaged and to determine the location and rotational angle of the inertial sensor assembly appearing in the first image;
analyzing the second image to decode the coordinate encoded pattern imaged and to determine the location and rotational angle of the inertial sensor assembly appearing in the second image;
calculating the angular position of the inertial sensor assembly based on the surface location and rotational angles in the captured images;
wherein the coordinate encoded surface pattern includes a double circle series pattern; and
wherein the double circle series pattern includes a first series of circles defining a series of meridian lines and a second series of circles defining a series of parallel lines.

27. A method for determining the angular position of an inertial sensor assembly, the method comprising:
simultaneously capturing a first image of the inertial sensor assembly and a second image of the inertial sensor assembly, where the first image and second image capture different locations on the surface of the inertial sensor assembly;
analyzing the first image to decode the coordinate encoded pattern imaged and to determine the location and rotational angle of the inertial sensor assembly appearing in the first image;
analyzing the second image to decode the coordinate encoded pattern imaged and to determine the location and rotational angle of the inertial sensor assembly appearing in the second image;
calculating the angular position of the inertial sensor assembly based on the surface location and rotational angles in the captured images;
wherein the coordinate encoded surface pattern includes a double circle series pattern; and
wherein the double circle series pattern includes a first series of circles defining a series of meridian lines and a second series of circles defining a series of meridian lines.

* * * * *